US009529548B1

(12) United States Patent
O'Maolcatha et al.

(10) Patent No.: US 9,529,548 B1
(45) Date of Patent: Dec. 27, 2016

(54) ARRAY-BASED REPLICATION IN DATA STORAGE SYSTEMS

(71) Applicant: EMC Corporation, Hopkinton, MA (US)

(72) Inventors: Fearghal O'Maolcatha, Cork (IE); Fergal Gunn, Cork (IE); Benjamin David, Cork (IE); Jody Hay, Buford, GA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 383 days.

(21) Appl. No.: 13/804,996

(22) Filed: Mar. 14, 2013

(51) Int. Cl.
*G06F 3/06* (2006.01)
*G06F 11/20* (2006.01)

(52) U.S. Cl.
CPC ............. *G06F 3/065* (2013.01); *G06F 3/067* (2013.01); *G06F 3/0619* (2013.01); *G06F 11/2056* (2013.01)

(58) Field of Classification Search
CPC .................................................. G06F 11/2056
See application file for complete search history.

(56) References Cited

U.S. PATENT DOCUMENTS

| | | | |
|---|---|---|---|
| 8,239,584 B1 * | 8/2012 | Rabe et al. ...................... 710/8 |
| 8,271,441 B1 * | 9/2012 | Natanzon et al. ............ 707/634 |
| 2003/0188218 A1 * | 10/2003 | Lubbers ............... G06F 11/2058 714/5.11 |
| 2004/0024961 A1 * | 2/2004 | Cochran et al. .............. 711/112 |
| 2005/0165617 A1 * | 7/2005 | Patterson ............... G06F 3/0607 705/59 |
| 2006/0047928 A1 * | 3/2006 | Bhasin et al. ................. 711/162 |
| 2006/0236047 A1 * | 10/2006 | Shitomi .............. G06F 11/1662 711/162 |
| 2008/0005507 A1 * | 1/2008 | Madnani et al. ............. 711/161 |
| 2008/0244174 A1 * | 10/2008 | Abouelwafa et al. ......... 711/114 |
| 2014/0195636 A1 * | 7/2014 | Karve et al. ................... 709/215 |

OTHER PUBLICATIONS

P. Mell et al., "The NIST Definition of Cloud Computing," U.S. Department of Commerce, Computer Security Division, National Institute of Standards and Technology, Special Publication 800-145, Sep. 2011, 7 pages.

* cited by examiner

*Primary Examiner* — Charles Rones
*Assistant Examiner* — Tian-Pong Chang
(74) *Attorney, Agent, or Firm* — Ryan, Mason & Lewis, LLP

(57) ABSTRACT

Techniques for improved replication of storage arrays in data storage systems. For example, a method comprises the following steps. A first set of physical storage devices in a data storage system are identified for replication. Specification is received from a user of at least one storage pool in the data storage system in accordance with which the first set of physical storage devices is to be replicated. A second set of physical storage devices is allocated from the user-specified storage pool. Data stored on the first set of physical storage devices is replicated onto the second set of physical storage devices.

20 Claims, 6 Drawing Sheets

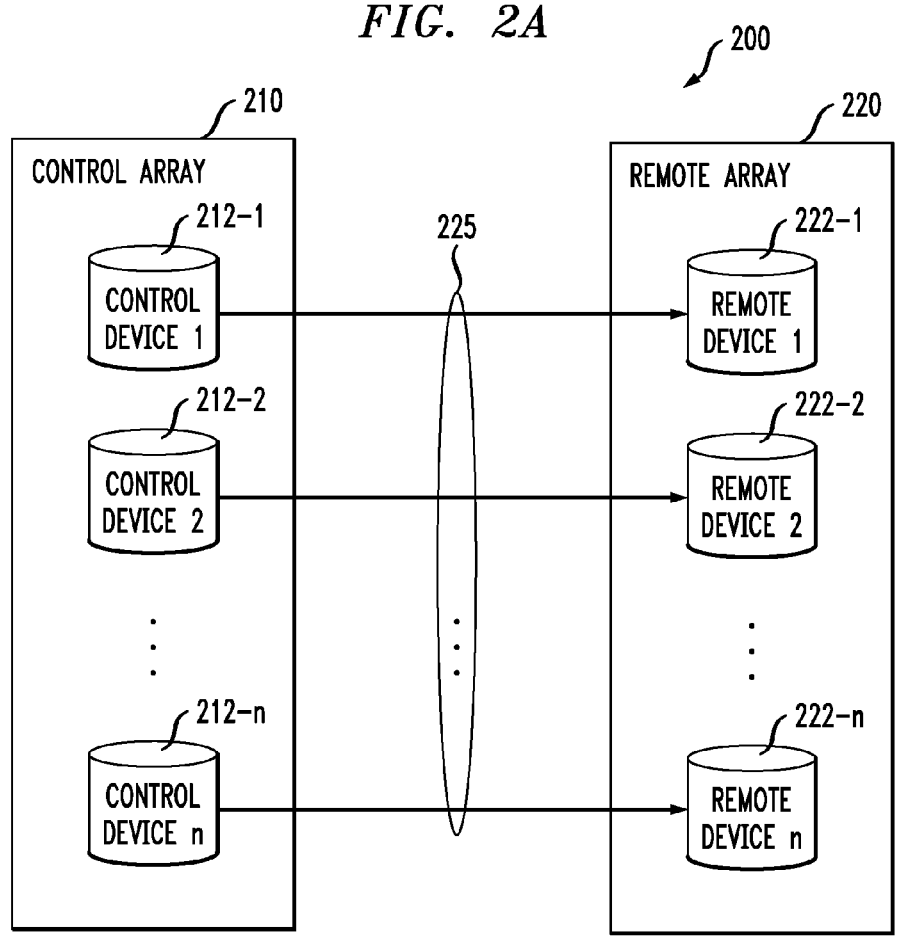

ARRAY-BASED REPLICATION IN DATA STORAGE SYSTEMS

FIELD

The field relates generally to data storage systems, and more particularly to techniques for replicating storage arrays in data storage systems.

BACKGROUND

A data storage system such as a Storage Area Network or SAN is composed of a set of physical storage devices (e.g., physical storage drives) that are grouped together into storage arrays called Redundant Array of Independent Disks or RAIDs. From a RAID group, logical storage units called Logical Units or LUNs are created and allocated to host computing devices to provide storage functions for operations or calculations being performed by the host computing devices.

Sometimes it is necessary to copy, i.e., replicate, data stored on one or more of these physical storage devices to one or more other physical storage devices, i.e., from one or more physical source storage devices to one or more physical target storage devices. The physical source and target storage devices may or may not be in the same RAID group. Typically, such a replication operation requires the administrator of the data storage system to designate a specific physical target storage device for each specific physical source storage device being copied. In addition, the administrator has to specify the appropriate mapping and masking designations for the replication operation. Such mapping and masking designations specify which LUNs are associated with which physical storage devices following the replication operation. However, when replicating a large number of source devices, these target device designating, mapping and masking tasks can be quite laborious for an administrator of the data storage system.

Accordingly, a need exists for improved storage replication techniques associated with data storage systems.

SUMMARY

Embodiments of the invention provide techniques for improved replication of storage arrays in data storage systems.

In one embodiment, a method comprises the following steps. A first set of physical storage devices in a data storage system are identified for replication. Specification is received from a user of at least one storage pool in the data storage system in accordance with which the first set of physical storage devices is to be replicated. A second set of physical storage devices is allocated from the user-specified storage pool. Data stored on the first set of physical storage devices is replicated onto the second set of physical storage devices.

In another embodiment, a computer program product is provided which comprises a processor-readable storage medium having encoded therein executable code of one or more software programs. The one or more software programs when executed by at least one processor device implement the steps of the above-described method.

In yet another embodiment, an apparatus comprises a memory and a processor operatively coupled to the memory and configured to perform the steps of the above-described method.

In a further embodiment, a data storage system is configured to perform the steps of the above-described method.

Advantageously, embodiments described herein provide techniques for improving replication of data storage arrays in a data storage system. For example, by enabling a user to specify a target storage pool rather than specifying particular storage devices in the target storage pool, the data on the source array can be replicated to the user-specified storage pool on the target array. This significantly reduces the amount of manual work involved for the user when replicating a large number of devices. Instead of having to specify a target device for each source device, the user specifies a target storage pool to replicate the data, and the system automatically allocates target storage devices from the target storage pool.

BRIEF DESCRIPTION OF THE DRAWINGS

FIGS. 2A and 2B show storage array replication according to an embodiment of the invention.

DETAILED DESCRIPTION

Embodiments of the present invention will be described herein with reference to exemplary computing systems and data storage systems and associated servers, computers, storage units and devices and other processing devices. It is to be appreciated, however, that embodiments of the invention are not restricted to use with the particular illustrative system and device configurations shown. Moreover, the phrases "computing system" and "data storage system" as used herein are intended to be broadly construed, so as to encompass, for example, private or public cloud computing or storage systems, as well as other types of systems comprising distributed virtual infrastructure. However, a given embodiment may more generally comprise any arrangement of one or more processing devices.

As used herein, the term "cloud" refers to a collective computing infrastructure that implements a cloud computing paradigm. For example, as per the National Institute of Standards and Technology (NIST Special Publication No. 800-145), cloud computing is a model for enabling ubiquitous, convenient, on-demand network access to a shared pool of configurable computing resources (e.g., networks, servers, storage, applications, and services) that can be rapidly provisioned and released with minimal management effort or service provider interaction.

Figure 1:
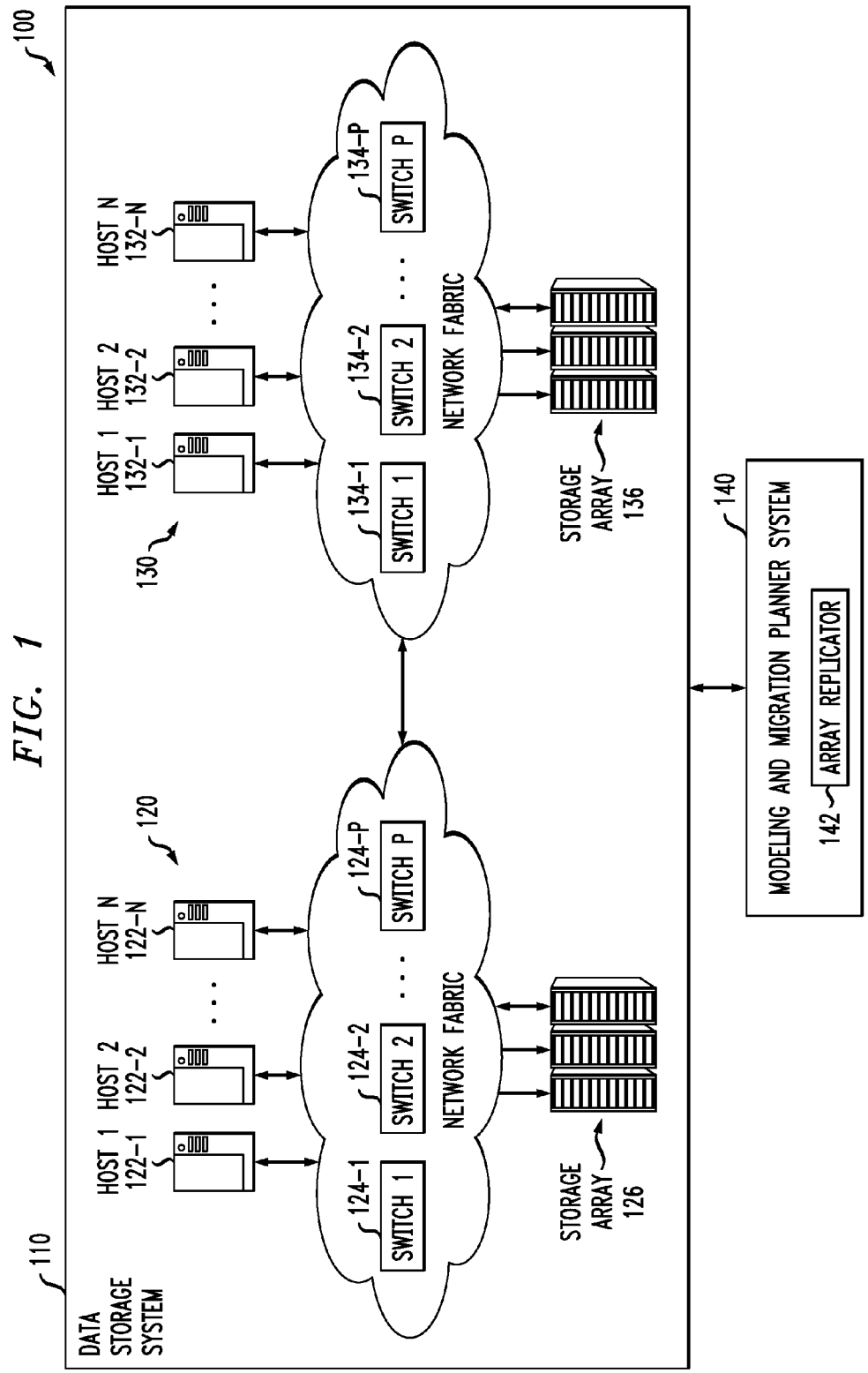
FIG. 1 shows a data storage environment with storage array replication according to an embodiment of the invention.

FIG. 1 shows a data storage environment with storage array replication according to an embodiment of the invention. As shown in data storage environment 100 in FIG. 1, a data storage system 110 includes a first data storage subsystem 120 and a second data storage subsystem 130. The first data storage subsystem 120, as shown, includes a plurality of host computing devices 122-1, 122-2, . . . , 122-N, a plurality of switches 124-1, 124-2, . . . , 124-P implemented as part of a network fabric (e.g., Fibre Channel fabric), and at least one storage array 126. Similarly, the second data storage subsystem 130, as shown, includes a plurality of host computing devices 132-1, 132-2, . . . , 132-N, a plurality of switches 134-1, 134-2, . . . , 134-P implemented as part of a network fabric (again, e.g., Fibre Channel fabric), and at least one storage array 136.

It is to be appreciated that while the data storage system 110 illustrates two data storage subsystems, system 110 may include a larger or smaller number of subsystems. Also, it is to be understood that while execution components shown in each subsystem include hosts, switches, fabric, and storage arrays, one or more of the subsystems may include additional execution components not expressly shown. For example, when the data storage system 110 is implemented as part of a distributed virtual infrastructure, each host may have associated therewith one or more virtual machines (VMs), while each storage array may have associated therewith one or more logical units (LUNs). Thus, each subsystem can have both logical execution components and physical execution components. Also, it is to be understood that each storage array may have one or more physical storage devices associated therewith.

Also shown in system environment 100 is a modeling and migration planner system 140. The planner system 140 is a computer-based tool used by administrators of the data storage system 110 to plan and automate array migrations within the data storage system. Thus, assume that data has to be migrated from storage array 126 in subsystem 120 to storage array 136 in subsystem 130, or vice versa. Also, data may need to be migrated from one storage array to another storage array within the same subsystem. Reasons for the data migration are application-dependent, but could be driven by data and resource management decisions made by the infrastructure provider.

Such a data migration task is typically accomplished by copying data stored on a storage array to another storage array, i.e., from one or more storage devices of the source storage array to one or more storage devices of the target storage array. The copying process is known as replication. Thus, as shown in the planner system 140, array replicator 142 performs the replication process.

By way of example, source and target array configurations are imported into the planner system 140 for use by replicator 142. The replicator 142 then maps data from the source storage devices to target storage devices. As will be explained in further detail below, the administrator provides input to this process via a graphical user interface (GUI).

FIGS. 2A and 2B show storage array replication according to an embodiment of the invention. As shown in replication process 200, a source storage array 210 (referred to as a "control array") includes a plurality of storage devices (control devices) 212-1, 212-2, . . . , 212-n, while a target storage array 220 (referred to as a "remote array") includes a plurality of storage devices (control devices) 222-1, 222-2, . . . , 222-n.

In this embodiment, each source device 212 of the control array 210 is explicitly mapped to a target device 222 on the remote array 220. The administrator, via a GUI, makes the explicit control-to-remote device assignments 225, and the replicator 142 generates a corresponding mapping 230 as shown in FIG. 2B. Note that each control device is designated by a symndev identifier in mapping 230, while each remote device is designated by a wwn (world wide name) identifier. Note that "symdev" refers to a Symmetrix storage array device commercially available from EMC Corporation of Hopkinton, Mass. However, it is to be understood that the replication methodologies described herein can be used with any storage devices. Using the mapping 230, the replicator 142 copies the data from each control device 212 of the source array 210 to each assigned remote device 222 of the target array 220. However, the administrator must specify the LUN mapping/masking assignments as well.

Figure 3A:
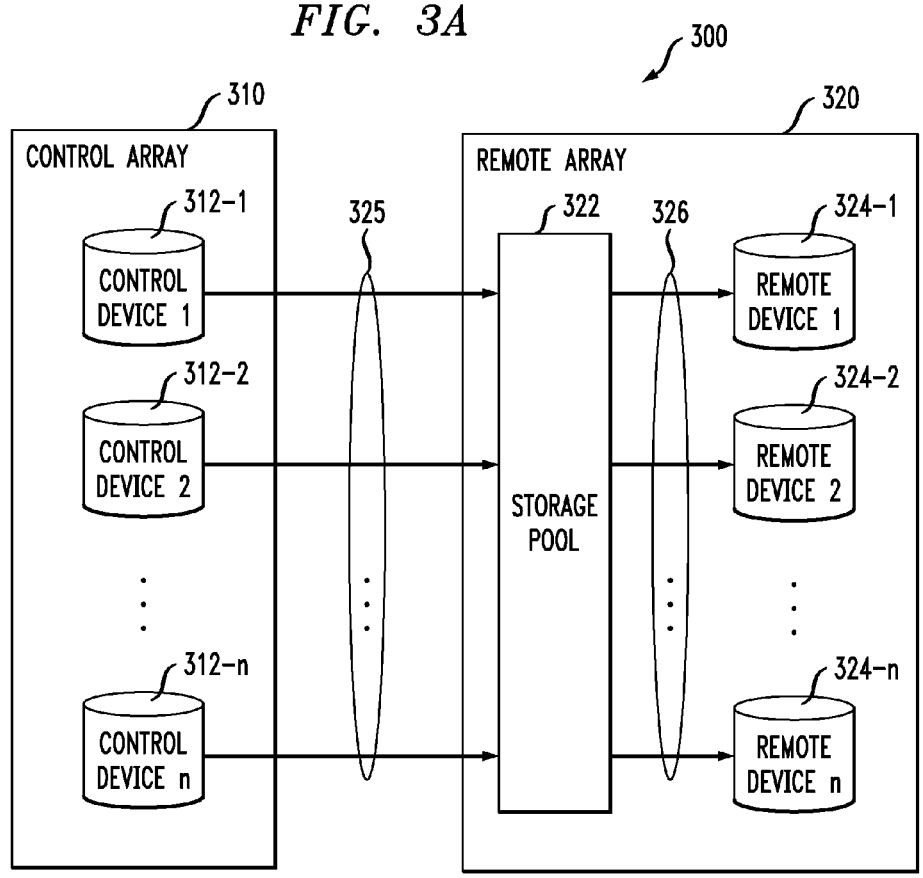
FIGS. 3A and 3B show storage array replication according to another embodiment of the invention.
Figure 3B:
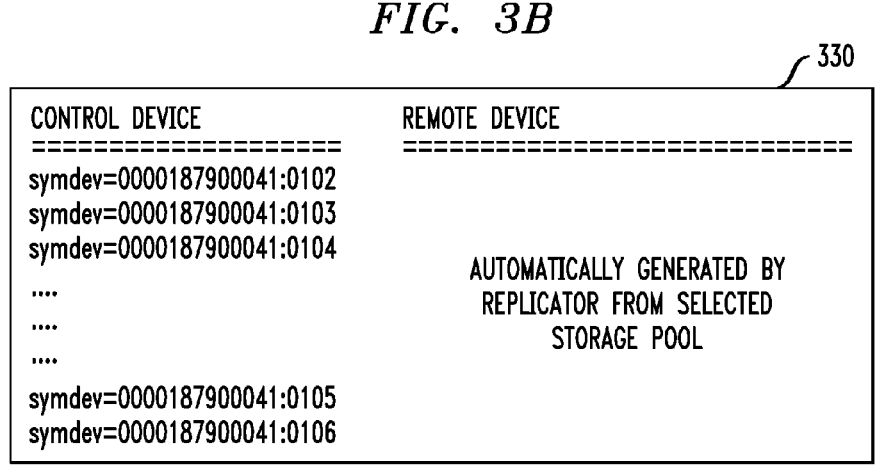

FIGS. 3A and 3B show storage array replication according to another embodiment of the invention. In replication process 300, the administrator specifies a storage pool to which the source devices are to be replicated. A "storage pool" here refers to a set of storage devices associated with the storage array. A given storage array can have multiple storage pools, in which case, a different subset of storage devices of the storage array are associated with each storage pool. However, the storage array can be defined by one single storage pool. The storage pool may be what is known as a "thin" storage pool, however, embodiments of the invention are not intended to be limited thereto.

Accordingly, replication process 300 enables the administrator to specify a target storage pool such that the data on the source array can be replicated to a storage pool on the target array. This significantly reduces the amount of manual work involved for the administrator when replicating a large number of devices. Instead of having to specify a target device for each source device (as in replication process 200), the administrator specifies a target storage pool to replicate the data. Replicator 142 subsequently creates the appropriate number of devices of the required size and type on the selected target storage pool, as well as sets up the session required to replicate the data. The replicator 142 also sets up the appropriate device LUN mapping and masking to facilitate the replication operation. For example, in at least one embodiment, the LUN mapping and masking is generated based on an existing zoning configuration between the two arrays.

Thus, as shown in FIG. 3A, a source storage array (control array) 310 includes a plurality of storage devices (control devices) 312-1, 312-2, . . . , 312-n, while a target storage array (remote array) 320 includes a plurality of storage devices (control devices) 324-1, 324-2, . . . , 324-n.

In this embodiment, as explained above, the administrator selects a storage pool 322 (selection operation 325), and the replicator 142 automatically maps (assignment operation 326) the source devices 312 of the control array 310 to respective target devices 324 of the remote array 320. That is, the administrator, via a GUI, makes the storage pool selection, and the replicator 142 autonatically generates a corresponding mapping 330 as shown in FIG. 3B. The actual control-to-remote device assignments (not shown) are then made available to the administrator.

Advantageously, replication operation 300 automatically models a new array device on the storage pool on the planned array and also models the appropriate device LUN mapping/masking. If the administrator then wants to make those modeled configuration changes on the physical source and target arrays, the replicator 142 generates one or more appropriate replication commands. Thus, such an array-based replication methodology allows for the creation of remote point-in-time copies of array devices. The replicator 142 enables the creation of sessions to move data from a source array to a target array. Examples of a replication push session and a replication pull session will now be described in the context of FIGS. 4A and 4B.

Figure 4A:
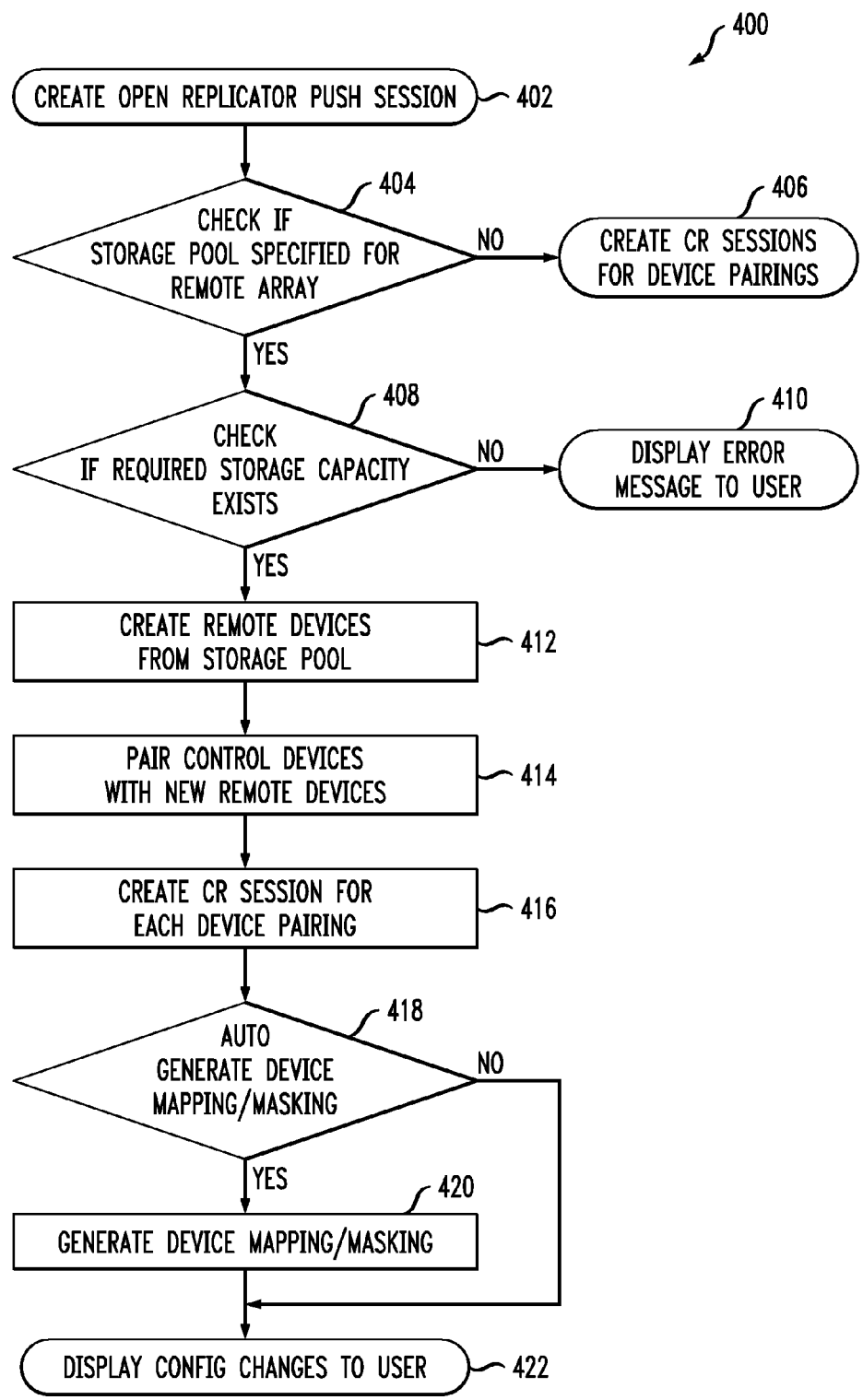
FIG. 4A shows a storage array replication push session methodology according to an embodiment of the invention.

FIG. 4A shows a storage array replication push session methodology according to an embodiment of the invention. It is to be appreciated that the replicator 142 is used to perform replication push methodology 400 in FIG. 4A. The term "push" here means that data is being copied from a control array to a remote array. Thus, the examples described above in the context of FIGS. 2A/2B and 3A/3B are considered push replication.

In step 402, a replication push session is created. In step 404, the methodology checks whether the administrator (or some other system) identified a target storage pool in the remote array. If not, then the administrator performs replication by making specific source device to target device assignments (e.g., as shown in FIGS. 2A/2B) in step 406.

Assuming that a target storage pool has been specified, a check is made in step 408 to determine that the pool has sufficient storage capacity to accommodate the control array. If not, an error message is returned to the administrator in step 410. If yes, in step 412, the replicator 142 creates the remote devices from the specified storage pool. In step 414, the replicator 142 pairs the control devices of the control array with the newly created remote devices.

In step 416, a (sub-)session is created for each pairing. The administrator is asked in step 418 whether he/she wishes for the replicator 142 to automatically generate LUN mapping/masking assignments. If yes, the replicator generates the LUN mapping/masking assignments in step 420. If not, in step 422, device configuration changes are presented to the administrator.

Figure 4B:
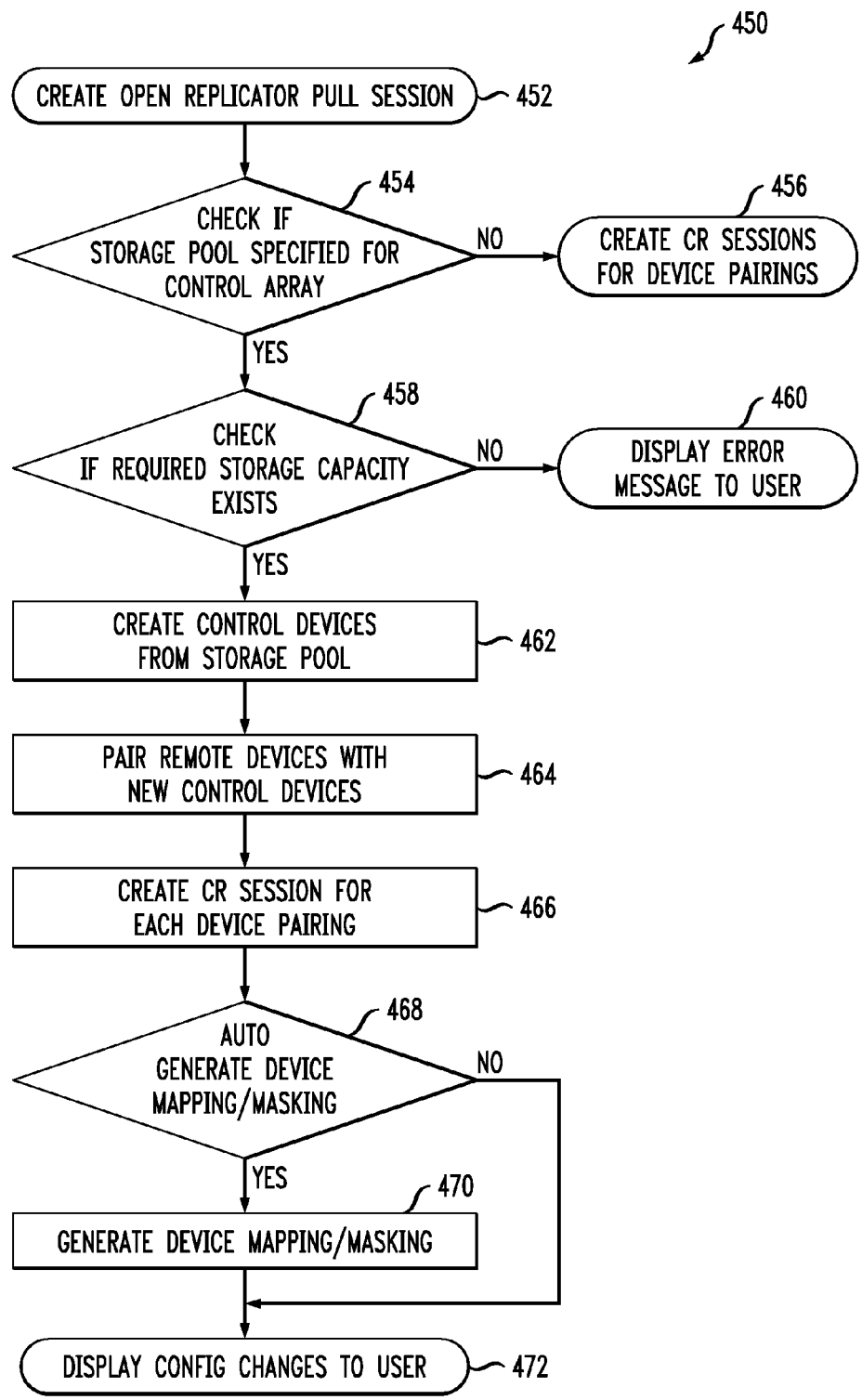
FIG. 4B shows a storage array replication pull session methodology according to an embodiment of the invention.

FIG. 4B shows a storage array replication pull session methodology according to an embodiment of the invention. It is to be appreciated that the replicator 142 is used to perform replication pull methodology 450 in FIG. 4B. The term "pull" here means that data is being copied from a remote array to a control array.

In step 452, a replication pull session is created. In step 454, the methodology checks whether the administrator (or some other system) identified a target storage pool in the control array. If not, then the administrator performs replication by making specific source device to target device assignments (e.g., as described above) in step 456.

Assuming that a target storage pool has been specified, a check is made in step 458 to determine that the pool has sufficient storage capacity to accommodate the remote array. If not, an error message is returned to the administrator in step 460. If yes, in step 462, the replicator 142 creates the control devices from the specified storage pool. In step 464, the replicator 142 pairs the remote devices of the control array with the newly created control devices.

In step 466, a (sub-)session is created for each pairing. The administrator is asked in step 468 whether he/she wishes for the replicator 142 to automatically generate LUN mapping/masking assignments. If yes, the replicator generates the LUN mapping/masking assignments in step 470. If not, in step 472, device configuration changes are presented to the administrator.

Figure 5:
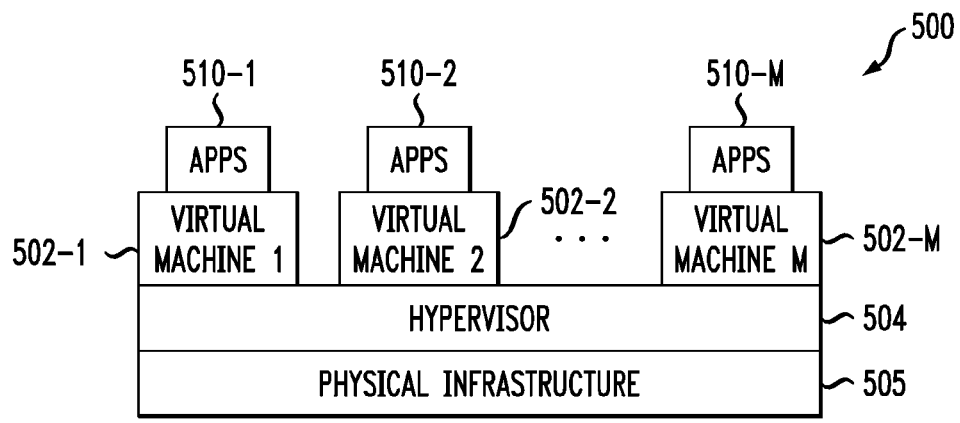
FIGS. 5 and 6 show examples of processing platforms that may be utilized to implement storage array replication according to an embodiment of the invention.

It is to be appreciated that the various components (logical and physical) illustrated and described in FIGS. 1 through 4B can be implemented in a distributed virtual infrastructure or cloud infrastructure. FIG. 5 illustrates a cloud infrastructure 500. As shown, the cloud infrastructure 500 comprises virtual machines (VMs) 502-1, 502-2, . . . , 502-M implemented using a hypervisor 504. The hypervisor 504 runs on physical infrastructure 505. The cloud infrastructure 500 further comprises sets of applications 510-1, 510-2, . . . , 510-M running on respective ones of the virtual machines 502-1, 502-2, . . . , 502-M (utilizing associated LUNs) under the control of the hypervisor 504.

Although only a single hypervisor 504 is shown in the example of FIG. 5, a given embodiment of cloud infrastructure configured in accordance with an embodiment of the invention may include multiple hypervisors, each running on its own physical infrastructure. Portions of that physical infrastructure might be virtualized.

As is known, virtual machines are logical processing elements that may be instantiated on one or more physical processing elements (e.g., servers, computers, processing devices). That is, a "virtual machine" generally refers to a software implementation of a machine (i.e., a computer) that executes programs in a manner similar to that of a physical machine. Thus, different virtual machines can run different operating systems and multiple applications on the same physical computer. Virtualization is implemented by the hypervisor 504 which, as shown in FIG. 5, is directly inserted on top of the computer hardware in order to allocate hardware resources of the physical computer (physical infrastructure 505) dynamically and transparently. The hypervisor 504 affords the ability for multiple operating systems to run concurrently on a single physical computer and share hardware resources with each other.

An example of a commercially available hypervisor platform that may be used to implement portions of the cloud infrastructure 500 in one or more embodiments of the invention is the VMware® vSphere™ which may have an associated virtual infrastructure management system such as the VMware® vCenter™. The underlying physical infrastructure 505 may comprise one or more distributed processing platforms that include storage products such as VNX and Symmetrix VMAX, both commercially available from EMC Corporation of Hopkinton, Mass., A variety of other storage products may be utilized to implement at least a portion of the cloud infrastructure 500.

Figure 6:
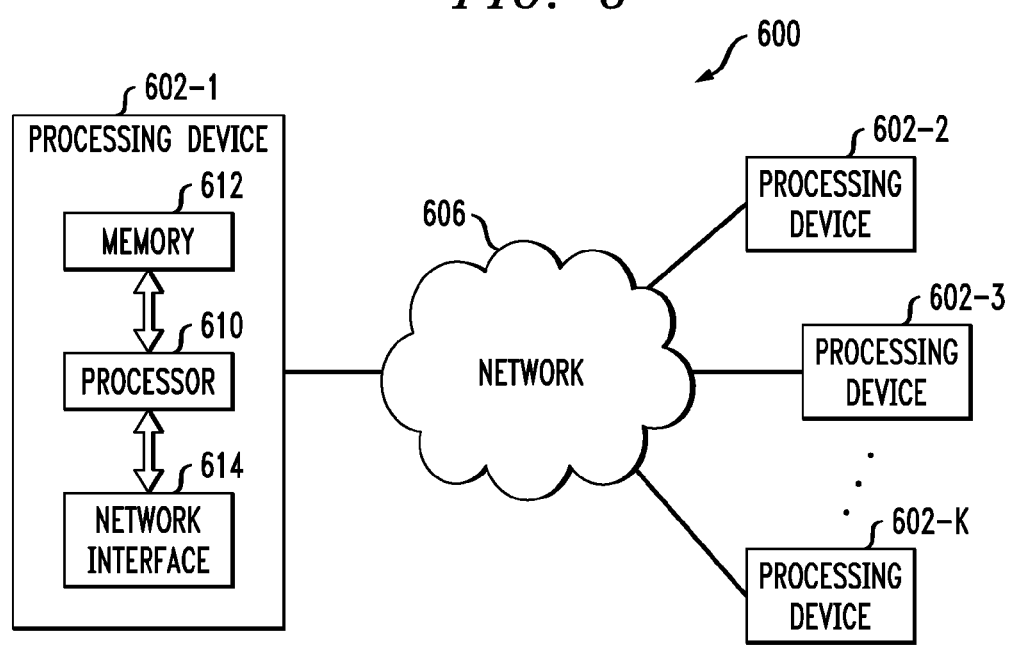

An example of a processing platform on which the cloud infrastructure 500 may be implemented is processing platform 600 shown in FIG. 6. The processing platform 600 in this embodiment comprises a plurality of servers denoted 602-1, 602-2, 602-3, . . . , 602-K which communicate with one another over a network 606. One or more of the components shown and described in FIGS. 1 through 5 may therefore each run on one or more storage arrays, servers, computers or other processing platform elements, each of which may be viewed as an example of what is more generally referred to herein as a "processing device." As illustrated in FIG. 6, such a device generally comprises at least one processor and an associated memory, and implements one or more functional modules for controlling certain features of components shown in FIGS. 1 through 5. Again, multiple elements or modules may be implemented by a single processing device in a given embodiment.

The server 602-1 in the processing platform 600 comprises a processor 610 coupled to a memory 612. The processor 610 may comprise a microprocessor, a microcontroller, an application-specific integrated circuit (ASIC), a field programmable gate array (FPGA) or other type of processing circuitry, as well as portions or combinations of such circuitry elements. The memory 612 may be viewed as an example of what is more generally referred to herein as a "computer program product." A computer program product comprises a processor-readable storage medium (which is a non-transitory medium) having encoded therein executable code of one or more software programs. Such a memory may comprise electronic memory such as random access memory (RAM), read-only memory (ROM) or other types of memory, in any combination. The computer program code when executed by a processing device such as the server 602-1 causes the device to perform functions associated with one or more of the components shown in FIGS. 1 through 5. One skilled in the art would be readily able to implement such software given the teachings provided herein. Other examples of computer program products embodying embodiments of the invention may include, for example, optical or magnetic disks.

Also included in the server 602-1 is network interface circuitry 614, which is used to interface the server with the network 606 and other system components. Such circuitry may comprise conventional transceivers of a type well known in the art.

The other servers 602 of the processing platform 600 are assumed to be configured in a manner similar to that shown for server 602-1 in the figure.

The processing platform 600 shown in FIG. 6 may comprise additional known components such as batch processing systems, parallel processing systems, physical machines, virtual machines, virtual switches, storage volumes, logical units, etc. Again, the particular processing platform shown in FIG. 6 is presented by way of example only, and components shown and described in FIGS. 1 through 5 may include additional or alternative processing platforms, as well as numerous distinct processing platforms in any combination.

Also, numerous other arrangements of servers, computers, storage devices or other components are possible for implementing components shown and described in FIGS. 1 through 5. Such components can communicate with other components over any type of network, such as a wide area network (WAN), a local area network (LAN), a satellite network, a telephone or cable network, a storage network (e.g., FC), a converged network (e.g., FCoE or Infiniband) or various portions or combinations of these and other types of networks.

It should again be emphasized that the above-described embodiments of the invention are presented for purposes of illustration only. Many variations may be made in the particular arrangements shown. For example, although described in the context of particular system and device configurations, the techniques are applicable to a wide variety of other types of information processing systems, computing systems, data storage systems, processing devices and distributed virtual infrastructure arrangements. In addition, any simplifying assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:

1. A method comprising the steps of:
    identifying a first set of physical storage devices in a first storage array of a data storage system for replication;
    receiving at a replicator module, from a user, a specification of a storage pool in a second storage array of the data storage system in accordance with which the first set of physical storage devices is to be replicated, wherein the user is an administrator of the data storage system;
    determining, by the replicator module, if the user-specified storage pool has sufficient storage capacity to accommodate the first storage array;
    in response to determining that the user-specified storage pool has insufficient storage capacity to accommodate the first storage array, the replicator module returning an error message to the user; and
    in response to determining that the user-specified storage pool has sufficient storage capacity to accommodate the first storage array:
    automatically creating, by the replicator module, a second set of physical storage devices of the second storage array from the user-specified storage pool;
    pairing, by the replicator module, at least one device of the first set of physical storage devices and one device of the second set of physical storage devices;
    receiving, by the replicator module, a request from the user to automatically generate logical unit (LUN) mapping and masking designations;
    automatically generating, by the replicator module, the LUN mapping and masking designations, wherein the LUN mapping and masking designations are generated based at least in part on an existing zoning configuration associated with the first and second storage arrays;
    automatically assigning, by the replicator module, the LUN mapping and masking designations for the at least one pairing; and
    replicating, by the replicator module, data stored on the first set of physical storage devices to the user-specified storage pool onto the second set of physical storage devices in accordance with the physical storage device pairing step and the LUN mapping and masking assignment step;
    wherein the steps of the method are performed by at least one processor device.

2. The method of claim 1, wherein the replicating step further comprises displaying results of the logical storage unit mapping step to the user.

3. The method of claim 1, wherein the replicating step is part of a push replication session.

4. The method of claim 1, wherein the replicating step is part of a pull replication session.

5. The method of claim 1, wherein the user-specified storage pool is one of a control array-based storage pool and a remote array-based storage pool.

6. The method of claim 1, wherein the data storage system is part of a distributed virtual infrastructure.

7. The method of claim 3, wherein the push replication session comprises the first set of physical storage devices forming a control array and the second set of physical storage devices forming a remote array.

8. The method of claim 4, wherein the pull replication session comprises the first set of physical storage devices forming a remote array and the second set of physical storage devices forming a control array.

9. A computer program product comprising a processor-readable storage medium having encoded therein executable code of one or more software programs, wherein the one or more software programs when executed by the at least one processor device implement the step of the method of claim 1.

10. An apparatus comprising:
    a memory; and
    at least one processor device operatively coupled to the memory to form a replicator module and configured to:
    identify a first set of physical storage devices in a first storage array of a data storage system for replication;
    receive at the replicator module, from a user, specification of a storage pool in a second storage array of the data storage system in accordance with which the first set of physical storage devices is to be replicated, wherein the user is an administrator of the data storage system; determine, by the replicator module, if the user-specified storage pool has sufficient storage capacity to accommodate the first storage array; in response to determining that the user-specified storage pool has insufficient storage capacity to accommodate the first storage array, return an error message to the user; and in response to determining that the user-specified storage pool has sufficient storage capacity to accommodate the first storage array:

automatically create, by the replicator module, a second set of physical storage devices of the second storage array from the user-specified storage pool; pair, by the replicator module, at least one device of the first set of physical storage devices and one device of the second set of physical storage devices; receive, by the replicator module, a request from the user to automatically generate logical unit (LUN) mapping and masking designations; automatically generate, by the replicator module, the LUN mapping and masking designations, wherein the LUN mapping and masking designations are generated based at least in part on an existing zoning configuration associated with the first and second storage arrays; automatically assign, by the replicator module, the LUN mapping and masking designations for the at least one pairing; and replicate, by the replicator module, data stored on the first set of physical storage devices to the user-specified storage pool onto the second set of physical storage devices in accordance with the physical storage device pairings and the LUN mapping and masking assignments.

11. The apparatus of claim 10, wherein replication further comprises displaying results of the logical storage unit mapping step to the user.

12. The apparatus of claim 10, wherein replication is part of a push replication session.

13. The apparatus of claim 10, wherein replication is part of a pull replication session.

14. The apparatus of claim 10, wherein the user-specified storage pool is one of a control array-based storage pool and a remote array-based storage pool.

15. The apparatus of claim 10, wherein the data storage system is part of a distributed virtual infrastructure.

16. A data storage system comprising:
a first set of physical storage devices in a first storage array;
a plurality of pools in a second storage array; and
an array-based replicator module, wherein the array-based replicator module is configured to:

receive, from a user, a specification of a pool from the second storage array in accordance with which the first set of physical storage devices is to be replicated, wherein the user is an administrator of the data storage system;

determine if the user-specified storage pool has sufficient storage capacity to accommodate the first storage array;

in response to determining that the user-specified storage pools has insufficient storage capacity to accommodate the first storage array, return an error message to the user; and in response to determining that the user-specified storage pool has sufficient storage capacity to accommodate the first storage array:

automatically create a second set of physical storage devices of the second storage array from the user-specified pool; pair at least one device of the first set of physical storage devices and one device of the second set of physical storage devices; receive a request from the user to automatically generate logical unit (LUN) mapping and masking designations; automatically generate the LUN mapping and masking designations, wherein the LUN mapping and masking designations are generated based at least in part on an existing zoning configuration associated with the first and second storage arrays; automatically assign the LUN mapping and masking designations for the at least one pairing; and replicate data stored on the first set of physical storage devices to the user-specified pool onto the second set of physical storage devices in accordance with the physical storage device pairings and the LUN mapping and masking assignments.

17. The data storage system of claim 16, wherein the user-specified storage pool is one of a control array-based storage pool and a remote array-based storage pool.

18. The data storage system of claim 16, wherein the data storage system is part of a distributed virtual infrastructure.

19. The data storage system of claim 18, wherein the distributed virtual infrastructure comprises a cloud infrastructure.

20. The data storage system of claim 16, wherein the data storage system is part of a storage area network.

\* \* \* \* \*